United States Patent [19]
Phelps, Sr.

[11] 3,734,086
[45] May 22, 1973

[54] EQUIPMENT FOR MEASURING AND DISPLAYING THE TIME LAPSE BETWEEN A GIVEN HEARTBEAT AND THE CORRESPONDING ARTERIAL PULSE

[76] Inventor: Jerry Allan Phelps, Sr., 6013 Innes Trace Road, Louisville, Ky. 40222

[22] Filed: Mar. 24, 1971

[21] Appl. No.: 127,573

[52] U.S. Cl. ......128/2.06 R, 128/2.05 P, 128/2.05 T, 128/2.06 F
[51] Int. Cl. .............................................. A61b 5/04
[58] Field of Search ..................... 128/2.05 P, 2.05 E, 128/2.05 R, 2.05 T, 2.06 A, 2.06 B, 2.06 F, 2.06 G, 2.05 A

[56] References Cited

UNITED STATES PATENTS

| | | |
|---|---|---|
| 3,154,066 | 10/1964 | Grindheim et al. ...............128/2.05 P |
| 3,090,377 | 5/1963 | Salisbury et al...................128/2.05 E |
| 3,228,391 | 1/1966 | Fitter et al. .......................128/2.05 T |
| 3,602,222 | 8/1971 | Herndon ..........................128/2.06 F |
| 3,613,670 | 10/1971 | Edenhofer........................128/2.06 F |
| 3,463,143 | 8/1969 | Karsh ...............................128/2.06 A |
| 3,132,643 | 5/1964 | Baum et al.......................128/2.05 A |

Primary Examiner—William E. Kamm
Attorney—Arthur F. Robert

[57] ABSTRACT

An apparatus for measuring the time interval between a heartbeat detected by an electrocardiographic detecting system and the corresponding peripheral pulse detected by a pulse sensing system is disclosed. Further features include a battery supply with a charging circuit and battery condition indicating means and a capacitor-type sample and hold circuit with constant current charging means and meter readout calibrated in pulse propagation time.

1 Claim, 2 Drawing Figures

EQUIPMENT FOR MEASURING AND DISPLAYING THE TIME LAPSE BETWEEN A GIVEN HEARTBEAT AND THE CORRESPONDING ARTERIAL PULSE

BACKGROUND OF THE INVENTION

A real time indication of cardiac activity, vascular status, and blood flow is very helpful in monitoring the status of a patient. This may be in regard to the clinical evaluation of a disease, the monitoring of an ill patient, or in any area where an indication of the cardiovascular integrity is deemed important.

The electrocardiogram (E.C.G.), commonly displayed or recorded in ill patients or during operations, does not give any indication of tissue blood flow other than in the heart itself; in fact, peripheral circulation may be absent in the presence of a normal electrocardiogram.

Many other signs of vascular decompensation are now monitored, i.e., blood pressure and pulse rate, but these parameters may only be abnormal when damage has already been done, or may not be as early a warning of impending difficulty as previously thought. During an anesthetic the pulse propigation time from the heart to an extremity, typically a finger or toe, is prolonged prior to any change in the blood pressure, pulse rate or electrocardiogram. In other words, prolongation of the pulse propigation time from the heart to a finger or toe provides an earlier warning of cardiovascular depression to a degree never possible before.

There are instruments to display the blood flow through an artery, but these require surgical procedures to attach the sensors directly to the artery, and these instruments indicate blood flow only in a segment of a particular artery.

To the present, there has been no instrument to detect, determine, and display the pulse propagation time from the heart to an extremity, typically a finger or toe, and to do this by noninvasive means.

As previously mentioned, the blood flow in a segment of a particular artery can be determined, but the attachment of the sensors requires surgery, surgical skill, and knowledge. The present invention uses noninvasive means to determine the pulse propigation time, requiring only: 1.) strapping the peripheral pulse detector on a finger or toe, and, 2.) cleansing of the skin and taping the electrocardiogram electrodes to the arms. This may be done by persons without any special training, skill, or knowledge.

Because of the currently recognized hazards of electrocution or cardiac arrest during the use of high A.C. voltage equipment, especially in patients with internal cardiac electrodes, the present invention is battery powered.

SUMMARY OF THE INVENTION

A compact, self-contained, transistorized instrument primarily utilizing integrated circuits to detect, determine, and display the pulse propigation time from the heart to an extremity, typically a finger or toe, in an individual. The present invention may be used with its own peripheral pulse and electrocardiogram detectors and amplifiers, or it may be used with external peripheral pulse and electrocardiogram detectors and amplifiers.

The present invention detects each cardiac ventricular contraction (systole) from the electrocardiogram, and the succeeding peripheral pulse from a pulse detector strapped to a finger or toe. Each timing cycle is initiated by a cardiac ventricular contraction and ended by the succeeding peripheral pulse. Upon the completion of the timing cycle, the elapsed time, in hundredths of a second, is immediately displayed on a milliammeter. When the next timing cycle is completed, its duration is immediately displayed on the milliammeter.

The present invention is battery powered, typically nickel-cadmium, rechargable batteries are used, provides a meter readout of the hours use remaining, and has its own recharging circuit so recharging may be accomplished from any standard 120 volt A.C. electrical outlet.

OBJECTS OF THE INVENTION

It is therefore an object of this invention to provide a monitor to detect, determine, and display the pulse propigation time from the heart to an extremity, typically a finger or toe, in hundredths of a second.

A further object of the present invention is to provide the pulse propigation time on a continuous, real time basis.

A further object of the present invention is to provide a monitor which is portable, compact, lightweight, and which does not require the services of highly skilled personel during the operation thereof.

A further object of the present invention is to provide a completely dependable and reliable automatic pulse propigation time monitor.

A further object of the present invention is to provide for an entirely transistorized pulse propigation time monitor, primarily using integrated circuits.

A further object of the present invention is to provide the determination and display of the pulse propigation time without its own peripheral pulse and electrocardiogram detectors and amplifiers; when connected to standard peripheral pulse and electrocardiogram detectors and amplifiers via the external peripheral pulse and electrocardiogram inputs.

DESCRIPTION OF THE DRAWINGS

Other objects and advantages of the present invention will become apparent from the following detailed description of the preferred embodiment thereof, when considered in conjunction with the accompanying drawings, wherein.

DESCRIPTION OF THE PREFERRED EMBODIMENT

The pulse propigation time from the heart to an extremity, typically a finger or toe, is an important measure of a patient's cardiac, vascular, and blood volume status. It consists of the time required for ventricular depolarization, the time for isometric contraction of the ventricle, and the time for transmission of the arterial pressure wave from the aortic valve to the point of pulse detection on the extremity.

It has been shown that the time it takes for a pulse wave to travel from a patient's heart to his finger becomes prolonged during anesthesia before there is any change in his blood pressure, pulse rate, or electrocardiogram. Some of the prolongation is due to an increased isometric contraction interval, but most of the delay is attributed to a decreased transmission of the pulse wave in the aorta and arteries. It has also been shown that a decrease in cardiac output can slow the arterial pressure wave.

From this it is assumed that the prolongation of the pulse propigation time is caused by both a decrease in myocardial contractility and a decrease in cardiac output. The present invention therefore provides a method of earlier detection of cardiovascular depression by noninvasive means than ever possible before.

All that is required for the present invention to function is to strap the peripheral arterial pulse detector on the distal phalanx of a finger or toe, and to tape three silver-silver chloride electrodes to which a standard conductive paste has been applied to the patient's skin which has been cleaned. The two detecting electrodes are placed as far from the heart and from each other as possible, typically one electrode on each arm. The third electrode connects the patient to the circuit ground and may be applied to any convenient spot on the patient's body. From this it can be seen that the use of the present invention does not require personnel with any special training or knowledge.

Figure 1:
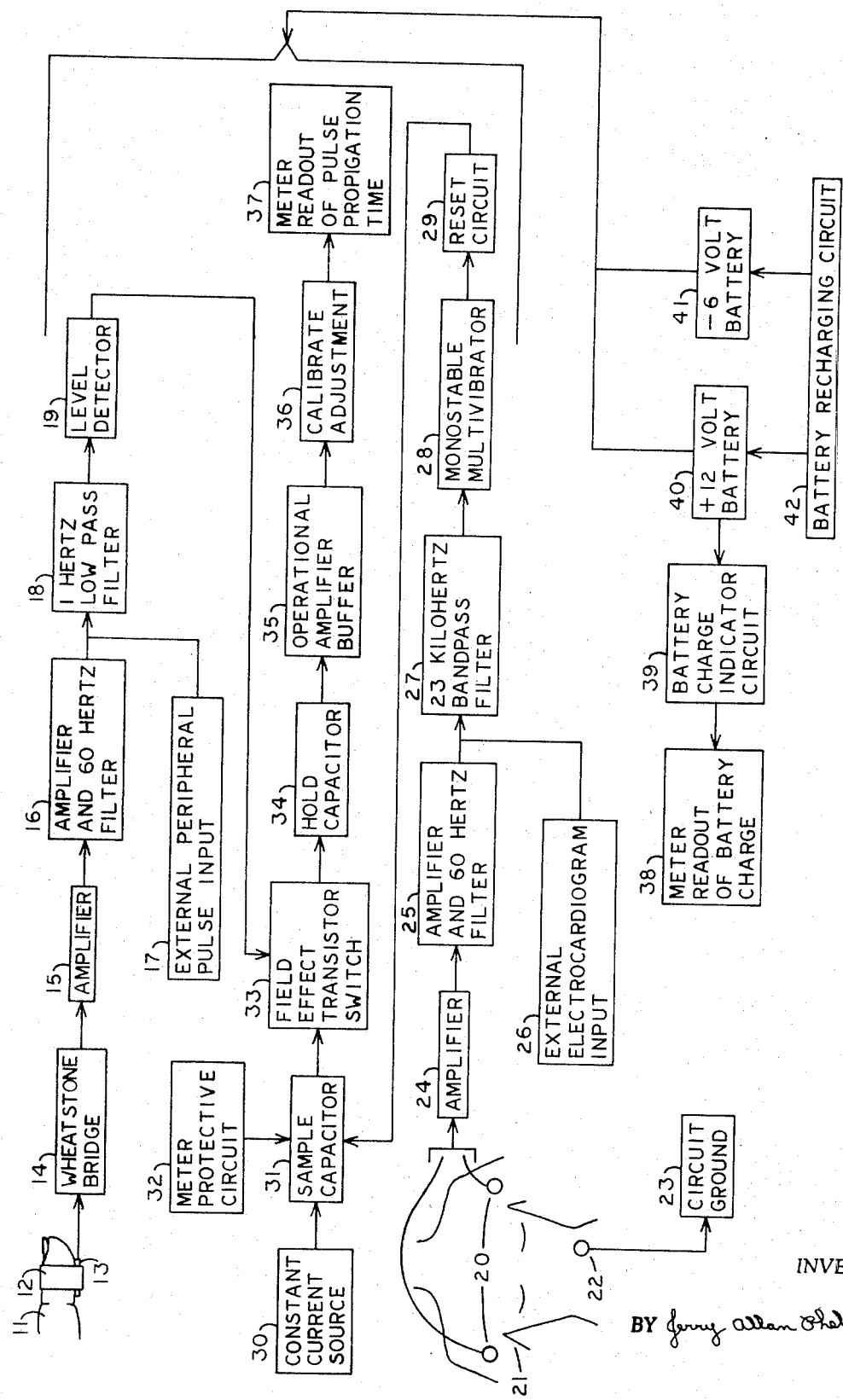
FIG. 1 is a block diagrammatic representation of a preferred embodiment of a pulse propigation time detecting, determining, and displaying device in accordance with the present invention during utilization by a patient.

The present invention will now be described in detail with particular reference to FIG. 1, showing the diagrammatic representation of the preferred embodiment.

The apparatus of the present invention utilizes the technique of applying a sensor to the distal phalanx of the patient's finger 11 to detect the peripheral pulse waveform. The detector is a miniature semiconductor strain gauge 13 which is easily applied to the distal phalanx of a finger 11, employing a Velcro cuff 12. The detector is small enough (10 × 5 m.m.) to be used on newborns as well as adults. The peripheral pulse is detected by the strain gauge 13 which forms one limb of the Wheatstone bridge 14.

The output of strain gauge 13 is an electrical signal that varies in amplitude in proportion to the pressure acting through an artery wall. Since the heart beats, the flow of blood through the arteries is necessarily pulsating. Therefore the electrical signal detected has a substantially pulse-like waveform.

Due to unbalance in the Wheatstone bridge 14 caused by the peripheral arterial pulse, a signal is transferred to amplifier 15 to be amplified. The output of amplifier 15 passes through amplifier and filter 16 which further amplifies the signal and removes any 60 Hertz interference present.

The peripheral pulse gain adjustment 45, which is a part of amplifier and filter 16, may be adjusted to provide an adequate signal, after passing through the 1 Hertz low pass filter 18, to trigger the level detector 19.

The present invention may be used with currently available peripheral pulse detectors and amplifiers. In this case, the output from a standard peripheral pulse detector and amplifier is fed into the external peripheral pulse input 17.

The peripheral pulse waveform, either from the amplifier and 60 Hertz filter 16 or the external peripheral pulse input 17 is then fed to a low pass (1 Hertz) filter 18 to remove the dicrotic notch caused by aortic valvular closure, which could cause an abnormal readout of the pulse propigation time. The signal then triggers a level detector 19 which provides a negative step change in voltage. This negative pulse from level detector 19, representing the peripheral pulse waveform, and the end of one timing cycle for the measurement of the pulse propigation time, then momentarily turns on field effect transistor switch 33.

The apparatus of the present invention utilizes the technique of applying two standard silver-silver chloride electrodes 20 filled with a standard conductive paste to two separate points on the patient's body distant from the heart, typically the patient's arms 21, to detect the electrical activity of the heart (electrocardiogram). A third silver-silver chloride electrode 22 filled with a standard conductive paste grounds the patient to the circuit ground 23, and may be placed anywhere on the patient's skin. The silver-silver chloride electrodes 20 and 22 are small enough to be used on newborns as well as adults, and are fastened to the patient's body with adhesive tape or any suitable adhesive.

The detected electrocardiogram is fed to amplifier 24 to be amplified. The output of amplifier 24 passes through amplifier and 60 Hertz filter 25 which further amplifies the electrocardiogram and removes any 60 Hertz interference present.

The electrocardiogram gain adjustment 44, which is part of amplifier and 60 Hertz filter 25, may be adjusted to provide an adequate signal, after passing through the 23 Kilohertz bandpass filter 27, to trigger the monostable multivibrator 28.

The present invention may be used with currently available electrocardiogram detectors and amplifiers. In this case, the output from the standard electrocardiogram detector and amplifier is fed into the external electrocardiogram input 26.

The electrocardiogram, either from the amplifier and 60 Hertz filter 25 or the external electrocardiogram input 26 is then fed to a 23 Kilohertz bandpass filter 27 to remove all components of the electrocardiogram except the QRS waveform, which represents cardiac ventricular contraction (systole).

The QRS waveform from 23 Kilohertz bandpass filter 27 then triggers monostable multivibrator 28 which generates a positive pulse and momentarily activates reset circuit 29. When activated, the reset circuit 29 momentarily shorts the timing or sample capacitor 31 to ground, resetting sample or timing capacitor 31 to zero volts.

Constant current source 30 provides a source of constant current which is passed to sample capacitor 31. This provides a linear ramp voltage from sample capacitor 31 that is directly proportional to time. In other words, when the output from the timing or sample capacitor 31 is 0.1 volts in 0.1 seconds, it will be 0.2 volts in 0.2 seconds, 0.3 volts in 0.3 seconds, and so on.

Meter protective circuit 32 limits the maximum voltage output from sample capacitor 31 so that meter readout of pulse propigation time 37 cannot be overloaded if the sample capacitor 31 is not reset to zero volts periodically by reset circuit 29.

Field effect transistor switch 33 is normally off; when it is momentarily turned on by level detector 19, it allows the voltage on sample timing or capacitor 31 to be transferred to hold capacitor 34. This voltage on hold capacitor 34 then remains constant due to operational amplifier buffer 35 until the field effect transistor switch 33 is again turned on, at which time a new voltage on sample capacitor 31 is transferred to hold capacitor 34.

Calibrate adjustment 36 allows the current output from operational amplifier buffer 35 to be adjusted to the meter used in meter readout of pulse propigation time 37. Typically a 0 to 1 milliammeter is used in meter readout of pulse propigation time 37, and is calibrated in hundredths of a second, from 0 to 1 second.

For a constant load, as provided in calibrate adjustment 36, the current output from operational amplifier buffer 35 is directly proportional to the voltage on hold capacitor 34. In other words, if 100 microamperes from calibrate adjustment 36 equals 0.1 volts on hold capacitor 34, then 200 microamperes from calibrate adjustment 36 will equal 0.2 volts on hold capacitor 34, 300 microamperes from calibrate adjustment 36 will equal 0.3 volts on hold capacitor 34, and so on.

In summary, the voltage on sample capacitor 31 is directly proportional to time. This voltage on sample capacitor 31 is transferred to hold capacitor 34 via field effect transistor switch 33 and is still proportional to time. The voltage on hold capacitor 34 is directly proportional to the current output from calibrate adjustment 36. Therefore the current output from calibrate adjustment 36 is directly proportional to time.

The calibrate adjustment 36 is set so that, after sample capacitor 31 is reset to zero volts, the milliammeter in meter readout of pulse propigation time 37 will read one second (full scale) when the field effect transistor switch 33 is momentarily turned on one second later.

From the above, it can be seen that the pulse propigation time is measured by the QRS complex from the electrocardiogram causing the sample capacitor 31 to be reset to zero volts and then the peripheral pulse waveform causing the field effect transistor switch 33 to momentarily be turned on and transfer a voltage proportional to time from sample capacitor 31 to hold capacitor 34. This voltage drives operational amplifier buffer 35 and is read out in hundredths of a second on the milliammeter in meter readout of pulse propigation time 37.

Following the momentary turning on of the field effect transistor switch 33 by the peripheral pulse, the sample capacitor 31 is again reset to zero volts by the next QRS complex, and a new timing cycle begins. The next peripheral pulse again momentarily turns on field effect transistor switch 33 and a new voltage representing the new ventricular to finger pulse propigation time is transferred to hold capacitor 34, which, in turn, is read out in hundredths of a second of the milliammeter in the meter readout of pulse propigation time 37.

The battery charge indicator circuit 39 is a series pass transistor circuit driven by the +12 volt battery 40 and adjusted to turn off when the output from the +12 volt battery 40 drops to +10 volts. The battery charge indicator circuit 39 drives a microammeter, typically 0 to 500 microamperes, in the meter readout of battery charge 38, and is set so the microammeter reads full scale with a full battery charge on the +12 volt battery 40. The microammeter is calibrated in hours of battery use left, and therefore tells how long the present invention may be used, and when its power supply needs recharging.

Figure 2:
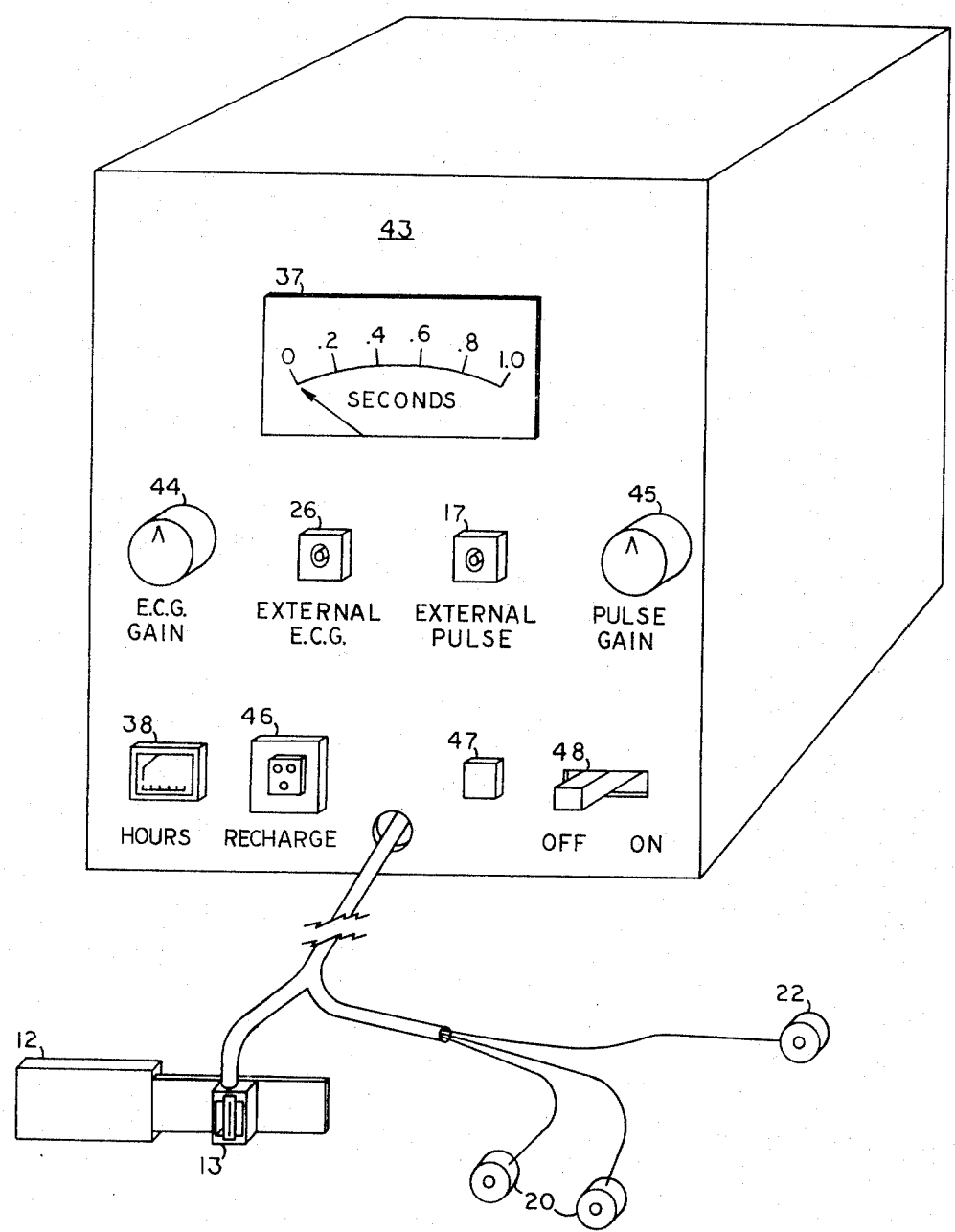
FIG. 2 is an embodiment in which the pulse propigation time monitor is portable and self-contained.

The electronic circuitry in the apparatus described above is entirely solid state, primarily utilizes integrated circuit operational amplifiers, is powered by a +12 volt and a −6 volt D.C. power supply, typically a +12 volt battery 40 and a −6 volt battery 41, and may be contained in one compact unit 43, as shown in FIG. 2. The +12 volt battery 40 and −6 volt battery 41 are typically nickel-cadmium, and included in the unit 43.

The +12 volt battery 40 and −6 volt battery 41 supply the positive and negative power supplies for the integrated circuit operational amplifiers. The Wheatstone bridge 14, which includes the semiconductor strain gauge 13, is powered by the −6 volt batter 41. The constant current source 30, 23 Kilohertz bandpass filter 27, and battery charge indicator circuit 39, are powered by the +12 volt battery 40.

A battery recharging circuit 42, contained in the unit 43, steps down, rectifies, and limits the 120 volts A.C. available from any standard electrical outlet to the proper D.C. voltages and currents to recharge the +12 volt battery 40 and −6 volt battery 41, typically nickel-cadmium batteries, which power the electronic circuitry. The recharging is done when the function switch 48 is in the off position, and is accomplished by connecting the recharging input 46 to any 120 volt A.C. outlet. When recharging is occurring, indicator lamp 47 is on.

It will be appreciated that my invention provides equipment for measuring and displaying the time lapse between a heartbeat and a corresponding peripheral arterial pulse, comprising: A. a timing or sample capacitor 31 for accumulating voltage on a linear basis when reset by a voltage discharge operation at the start of a timing cycle; B. an apparatus 20-25 and 27 or 26-27 for detecting the electrical activity characterizing the cardiac ventricular contraction of a heartbeat and for producing an electrical QRS signal corresponding to the QRS waveform content of said electrical activity; C. means 28-29 responsive to said QRS signal for resetting said timing capacitor to start a timing cycle; D. a current source 30 for charging said timing capacitor 31 during said timing cycle with a voltage which is directly proportional to the elapsed time; E. sensing and generating means including an arterial pulse detector 13 for sensing, at the end of said timing cycle, a peripheral arterial pulse corresponding to said heartbeat, and generating means, including either 14-16 and 18-19 or 17-19, for producing an electrical signal corresponding to said sensed pulse; and F. measuring and signaling means 33-37 operative, at the end of said timing cycle, in response to said electrical pulse-corresponding signal, to measure the time-proportional voltage of (or a corresponding voltage transferred from) said timing capacitor and to signal that measurement in terms of elapsed time. The QRS signal resets the timing cycle by resetting the timing capacitor 31 to zero volts. The measuring and signaling means includes a hold capacitor 34 and a normally open electrical switch 33 operative, when closed, to interconnect said timing and hold capacitors while said electrical pulse-corresponding signal ends the timing cycle by normally closing the normally open switch 33 to charge the hold capacitor 34 with a time-proportional voltage from the timing capacitor 31. Also, the measuring and signaling means includes a visual display device (meter 37) for providing an instantaneous read-out of the voltage on the hold capacitor 34 in terms of the elapsed time between the start and end of said timing cycle.

The present invention provides an instantaneous readout of the pulse propigation time, in hundredths of a second, from the heart to an extremity, typically a finger or toe. That is, the QRS complex initiates a timing cycle when it resets the sample capacitor 31 to zero volts, and the peripheral pulse waveform ends the timing cycle when it momentarily turns on the field effect transistor switch 33, causing an instantaneous readout of the pulse propigation time from the heart to a finger or toe on meter readout of pulse propigation time 37. This readout is displayed in hundredths of a second until the next timing cycle is completed, at which time it is displayed.

The information provided by the present invention, i.e., the pulse propigation time from the heart to a point on an extremity, typically a finger or toe, is obtained by a noninvasive means to the individual being monitored. That is, only surface detectors and electrodes are used. This has never been accomplished before.

If desired, the present invention can utilize the signals from standard peripheral pulse and electrocardiogram detectors and amplifiers to provide the pulse propigation time from the heart to a point on an extremity, typically a finger or toe. From this it is obvious that the present invention could be made in a form lacking its own peripheral pulse and electrocardiogram detectors and amplifiers, but provide the same information when used in conjunction with the above said standard detectors and amplifiers.

The present invention is compact, lightweight, entirely solid state, has its own self-contained, rechargable battery supply, operates for a long period of time before recharging is necessary, has an extremely short warm up time of 2 or 3 seconds, and may be used in a remote area. The present invention can be easily mounted on an anesthesia machine, shelf, or intravenous pole in the operating room. It is a valuable adjunct to the evaluation of a patient's cardiovascular status at any time; during an anesthetic or surgery, in the clinical evaluation of a patient's cardiovascular status, or during a life threatening illness as a myocardial infarction. Because of its noninvasive means of detection, the patient is not subjected to any stress to obtain the information, and no special knowledge, skill, or training is required to utilize the present invention.

Obviously many modifications and variations of the present invention are possible in light of the above teachings. It is therefore understood that within the scope of the appended claims the invention may be practiced otherwise than as specifically described.

What is claimed and desired to be secured by letters patent of the United States is:

1. Equipment for measuring and displaying the time lapse between a given heartbeat and the corresponding arterial pulse at a peripheral area of the body of a patient, comprising:
   A. a sample capacitor capable of accumulating voltage on a linear basis and operative, when reset by a voltage discharge operation, to start a given timing cycle;
   B. a heartbeat-actuated capacitor-resetting apparatus for discharging and resetting said sample capacitor to start a given timing cycle, said apparatus producing an electrical signal representative of the QRS waveform content of a given heartbeat, said apparatus including
      1. an ECG apparatus for detecting the electrical activity, which characterizes the cardiac ventricular contraction of said given heartbeat and for producing an electrical input signal representative of such electrical activity,
      2. a bandpass filter connected to said ECG apparatus and operative to remove substantially all components of said input signal except the QRS waveform,
      3. a monostable multivibrator connected to receive said QRS waveform from said bandpass filter and operative, in response thereto, to provide a step change in voltage, and
      4. a reset circuit connecting said sample capacitor to said monostable multivibrator and operative momentarily, in response to said multivibrator voltage change, to discharge said capacitor and thus reset it for the start of said given timing cycle;
   C. constant current supply and protective circuit means including
      1. a constant current source connected to said sample capacitor for charging it during said given timing cycle with a voltage which is directly proportional to the elapsed time, and
      2. a protective circuit connected to said sample capacitor and operative to limit its accumulation of voltage upon a failure to reset the sample capacitor at the end of said given timing cycle;
   D. a field effect transistor switch connected to said sample capacitor, said switch normally being biased off;
   E. pulse-actuated means for ending said given timing cycle by momentarily turning said field effect transistor switch on, said means including
      1. a peripheral-pulse detection apparatus for producing an electrical peripheral pulse input signal which is representative of the arterial pulse corresponding to said given heartbeat,
      2. a low pass filter connected to said peripheral-pulse-apparatus for receiving and modifying said peripheral-pulse input signal by removing, from it, the dicrotic notch characteristic of a peripheral pulse waveform, and
      3. a level detector connected to said low pass filter and to said field effect transistor switch and operative, in response to said modified peripheral pulse input signal, to provide a step change in the voltage which turns said transistor switch on momentarily; and
   F. means for displaying a time lapse readout, corresponding to the linear voltage which accumulated on the sample capacitor during said given timing cycle, said means including
      1. a hold capacitor connected to said field effect transistor switch and operative, when said transistor switch is momentarily turned on, to be charged with a voltage corresponding to the voltage which accumulated on said sample capacitor during said time lapse,
      2. an operational amplifier buffer connected to said hold capacitor to maintain the voltage charge on said hold capacitor at a constant value and to provide a current output directly proportional thereto,
      3. a meter for receiving an electrical input current and providing a visual time readout which is directly proportional to the input current it receives, and
      4. a calibrate adjustment connected to the buffer and the meter to provide the meter with input current directly proportional to the elapsed heartbeat-to-pulse time.

* * * * *